US006639603B1

(12) United States Patent
Ishii

(10) Patent No.: US 6,639,603 B1
(45) Date of Patent: Oct. 28, 2003

(54) HARDWARE PORTRAIT MODE SUPPORT

(75) Inventor: Takatoshi Ishii, Sunnyvale, CA (US)

(73) Assignee: Linkup Systems Corporation, San Jose, CA (US)

( * ) Notice: Subject to any disclaimer, the term of this patent is extended or adjusted under 35 U.S.C. 154(b) by 0 days.

(21) Appl. No.: 09/296,199

(22) Filed: Apr. 21, 1999

(51) Int. Cl.[7] .................................... G06F 12/10

(52) U.S. Cl. ....................... 345/568; 345/545; 345/564; 345/656; 345/658; 345/659

(58) Field of Search ................................ 345/501–503, 345/520, 533, 545, 564, 568, 569, 656, 658, 659

(56) References Cited

U.S. PATENT DOCUMENTS

| | | | | |
|---|---|---|---|---|
| 4,168,488 A | | 9/1979 | Evans | 340/146.3 H |
| 4,554,638 A | | 11/1985 | Iida | 364/521 |
| 4,716,533 A | | 12/1987 | Ohmori | 364/518 |
| 4,776,026 A | | 10/1988 | Ueyama | 382/46 |
| 4,952,920 A | | 8/1990 | Hayashi | 340/727 |
| 5,566,098 A | * | 10/1996 | Lucente et al. | 364/708.1 |
| 5,734,875 A | | 3/1998 | Cheng | 395/516 |
| 5,920,688 A | * | 7/1999 | Cooper et al. | 345/650 |
| 5,956,049 A | * | 9/1999 | Cheng | 345/517 |
| 5,966,116 A | * | 10/1999 | Wakeland | 345/126 |
| 5,973,664 A | * | 10/1999 | Badger | 345/126 |
| 6,226,016 B1 | * | 5/2001 | Chee et al. | 345/516 |
| 6,232,932 B1 | * | 5/2001 | Thorner | 365/230.05 |
| 6,262,751 B1 | * | 7/2001 | Chan | 345/572 |
| 6,262,769 B1 | * | 7/2001 | Anderson et al. | 348/333.1 |

OTHER PUBLICATIONS

*Programming Notes and Examples*; Epson; SED 1375 Embedded Memory LCD Controller; Document; No.: X27A–G–002–01; Issue Date Mar. 11, 1999; pp. 3, 37–46.

*Hardware Functional Specification*; Epson; SED 1375 Embedded Memory LCD Controller; Document No.: X27A–A–001–01; Issue Date Mar. 16, 1999; pp. 4, 76–80.

*Hardware Functional Specification*; Epson; SED 1374 Embedded Memory LCD Controller; Document No.: X26A–A–001–01; Issue Date Oct. 29, 1998; pp. 4, 78–82.

*Programming Notes and Examples*; Epson; SED 1374 Embedded Memory Color LCD Controller; Document No. X26A–G–002–01; Issue Date; Oct. 29, 1998; pp. 36–44.

*SED 1355 Technical Manual*; SED 1355 Embedded RAM-DAC LCD/CRT Controller; Document No. X23A–Q–001–01; Issue Date May 28, 1998: pp. 5, 129–132.

* cited by examiner

*Primary Examiner*—Ulka J. Chauhan
(74) *Attorney, Agent, or Firm*—Fenwick & West LLP

(57) ABSTRACT

A display subsystem supports both normal mode and portrait mode displays. In normal mode, the scan starts at the upper left comer of the display. In portrait mode, the scan starts at the lower left comer of the display. The display subsystem includes a dual mapped display memory having a normal mode display area and a portrait mode display area. The portrait mode display area is defined by X-ofst$_{(Virtual)}$ and Y-ofst. X-ofst$_{(Virtual)}$ is a power of two that is greater than the real X-ofst supported by the display in portrait mode. Address requests from the CPU or software use high order bits to specify whether the address is in the normal or portrait mode display area. In addition, address requests to the portrait mode display area use the address space defined by X-ofst$_{(Virtual)}$ and Y-ofst. When the address request specifies the portrait mode display area, the address of the request is translated to account for the different mode of the display. Since X-ofst$_{(Virtual)}$ is a power of two, the X-coordinate of the display location specified by the address can be determined without a division operation, thereby allowing for fast address translation. Logic within the display subsystem rapidly translates the address and supports a range of Y-ofst values.

15 Claims, 6 Drawing Sheets

HARDWARE PORTRAIT MODE SUPPORT

BACKGROUND

1. Field of the Invention

This invention pertains in general to a computer display controller and in particular to a display controller supporting both landscape and portrait display modes.

2. Background of the Invention

Most computer displays are refreshed in the same order—from left to right and top to bottom. In a cathode ray tube (CRT) display, the electron beam scans across the display tube in this order. In a liquid crystal display (LCD), the charge or voltage, depending on the display type, is applied to the liquid crystal cells in this order.

Images are usually stored internally by the computer in the same order. The top left corner of the image is stored at a starting memory address in the display buffer. Subsequent portions of the image in the scan order are stored at subsequent memory addresses.

FIG. 1A illustrates the scan order on a landscape display 100. The display has an X-direction offset (i.e., width) of X-ofst 110 and a Y-direction offset (i.e., height) of Y-ofst 112. The location of an individual pixel on the display is identified by an (X, Y) coordinate, where (0, 0) is the upper left pixel 114, (X-ofst-1, 0) is the upper right pixel 116, (0, Y-ofst-1) is the lower left pixel 118, and (X-ofst-1, Y-ofst-1) is the lower right pixel 120.

When the display is oriented so that the starting memory address in the display buffer corresponds with the upper left corner of the display, the display is said to be in "normal mode." In normal mode, the memory address in the display memory corresponding an (X, Y) location on the display is the same for software executing on the CPU ($MA_{CPU}$) and the display controller ($MA_{DISP}$). More specifically, the memory address in the display buffer for a location (X, Y) on the display is described by the equation:

$$MA_{CPU}=MA_{DISP}=(Y*X\text{-}ofst)+X,$$

where the sum (Y*X-ofst)+X is the offset from the starting memory address.

However, if the display is rotated, then these two addresses become different. For example, assume the display is rotated 90 degrees counterclockwise. For purposes of this discussion, the rotated display is in "portrait mode." After this rotation, the scan begins in the lower left corner and moves from bottom to top, left to right.

FIG. 1B illustrates the scan order on a portrait mode display 150. In portrait mode, Y-ofst 154 is larger than X-ofst 152. As with normal mode, the location of an individual pixel in portrait mode is described by an (X, Y) coordinate, and (0, 0) is the upper left pixel 156, (X-ofst-1, 0) is the upper right pixel 158, (0, Y-ofst-1) is the lower left pixel 162, and (X-ofst-1, Y-ofst-1) is the lower right pixel 160. X coordinates extending beyond X-ofst 152 define a Virtual display area 166. In this description, the X-direction offset for the Virtual display area is referred to as X-ofst$_{(Virtual)}$ 164 while the X-ofst for the real display area is referred to as X-ofst$_{(Real)}$ 152.

In portrait mode, memory addresses in the display buffer correspond to different (X, Y) positions on the display than in normal mode. For compatibility reasons, the display controller preferably treats the starting memory address as the first scan position, regardless of the display mode. Since the first scan position is now the lower left corner of the display, memory addresses for locations (X, Y) on the display are defined by the following equation:

$$MA_{DISP}=X*Y\text{-}ofst+((Y\text{-}ofst\text{-}1)-Y).$$

If, for example, software executing on the CPU needs to write to the upper left corner of the display (location (0,0)), the software should write to the memory address offset by Y-ofst-1 from the starting address.

However, it is not practical to force the software to write to different memory addresses depending on the orientation of the display. A special software program is needed to translate normal mode address requests into portrait mode addresses. The special program may require a large number of additional memory cycles to perform the translation. As a result, using the special software to perform a large number of address translations for read and write requests consumes significant computing resources and may make screen updating and drawing take ten times longer. For these reasons, it is undesirable to let software handle address translation.

Thus, when the display is in portrait mode there is a need to translate memory addresses produced by software into corresponding addresses in the display memory. A display translation from normal mode to portrait mode (i.e., a 90 degree counterclockwise rotation) is equivalent to swapping the X and Y coordinates and inverting the Y coordinate. The translation can be performed quickly in hardware if the X and Y values are known.

For example, address translation is relatively easy if the display is 1024×1024 because each coordinate uses ten bits of the memory address. FIG. 2 is a block diagram 200 illustrating how to translate from normal mode to portrait mode using a fixed 1024×1024 display. The addresses before translation, $MA_{CPU}$ 210, and after translation, $MA_{DISP}$ 212, are shown. To effect the translation, bits 0–9 of $MA_{CPU}$ 210, which represent the X coordinate, are copied 214 to bits 10–19 of $MA_{DISP}$ 212, which represent the Y coordinate. Similarly, bits 10–19 of $MA_{CPU}$ 210, which represent the Y coordinate, are inverted and copied 216 to bits 0–9 of $MA_{DISP}$ 212, which represent the X coordinate. The copying and inverting can quickly be performed by hardware.

However, most displays are not 1024×1024. In fact, it is common for normal mode displays to have a 4:3 aspect ratio, meaning that the X-ofst is typically larger than the Y-ofst. In such a case, the coordinates must be calculated using the equations:

$$Y=\text{the quotient of } MA_{CPU}/X\text{-}ofst;\text{ and}$$

$$X=\text{the remainder of } MA_{CPU}/X\text{-}ofst.$$

Since a division operation is computationally expensive, it is difficult to quickly translate an address from $MA_{CPU}$ to $MA_{DISP}$.

Therefore, there is a need to maintain software compatibility in both normal and portrait display modes for displays of sizes other than, and including, 1024×1024. More specifically, there is a need to quickly translate $MA_{CPU}$ to $MA_{DISP}$ that does not cause performance degradation. There is a corresponding need to quickly switch from normal mode to portrait mode. A solution that meets these needs should work with a range of display sizes.

SUMMARY OF THE INVENTION

The above needs are met by a display subsystem that supports both normal mode and portrait mode displays. In normal mode, the scan starts at the upper left corner of the display. In portrait mode, the display is rotated 90 degrees counterclockwise and the scan starts at the lower left comer of the display.

The display subsystem according to the present invention includes a display memory for holding data to be displayed. The subsystem also includes a display controller for receiving memory access requests from the central processing unit (CPU), or software executing on the CPU, and accessing the memory in response. The display controller also reads data from the display memory and provides it to the display.

The display memory preferably includes a normal mode display area and a portrait mode display area. The normal mode display area is defined by X-ofst and Y-ofst values. These values correspond to the number of pixels displayed by the display in the X and Y dimensions, where (0, 0) is the top left comer of the display. An address in the normal mode display area for a particular location (X, Y) on the display is determined by the equation (Y*X-ofst)+X.

The portrait mode display area is similarly defined by X-$ofst_{(Real)}$ and Y-ofst values as measured from the top left comer of the display. X-$ofst_{(Real)}$ is the true X-ofst for the display and is distinguished from X-$ofst_{(Virtual)}$, which is a value greater than X-$ofst_{(Real)}$ and equal to a power of two. The CPU generates addresses for particular locations in the portrait mode display area using the equation Y*X-ofst $_{(Virtual)}$+X. Since the starting position in portrait mode is the lower left comer of the display, however, the address for an (X, Y) position from the perspective of the display controller is determined by the equation X*Y-ofst+((Y-ofst-1)−Y).

The display controller receives the memory access requests from the CPU. Preferably, the high address bit in the memory access request indicates whether the request is for the normal mode or the portrait mode display area. If the memory access request is for the portrait mode display area, the display controller preferably translates the address of the request into the corresponding address from the perspective of the display controller. Otherwise, the display controller passes the address to the memory without translation.

The display controller preferably includes address translation logic for translating the address from the CPU into the equivalent address from the perspective of the display controller. Since the address from the CPU was calculated using X-$ofst_{(Virtual)}$, the address translation logic can determine the value of the X coordinate from the address without performing a division operation. Preferably, the address translation logic includes an arrangement of adders, multiplexers, and gates that can quickly perform the translation for a range of Y-ofst values. In one embodiment, the logic includes four adders, two multiplexers, and two gates, although other embodiments may have different hardware. The hardware functions according to values held by a set of parameter registers. Software sets the values of the parameter registers to specify the Y-ofst values used by the address translation logic to translate addresses.

Accordingly, the present invention allows the display to be quickly and easily switched between normal mode and portrait mode. Since the display memory contains dual display areas, the utilized display area can be changed very quickly. Moreover, the use of the Virtual X-ofst allows the address translation logic to quickly translate addresses received from the CPU.

DETAILED DESCRIPTION OF THE PREFERRED EMBODIMENTS

Figure 3:
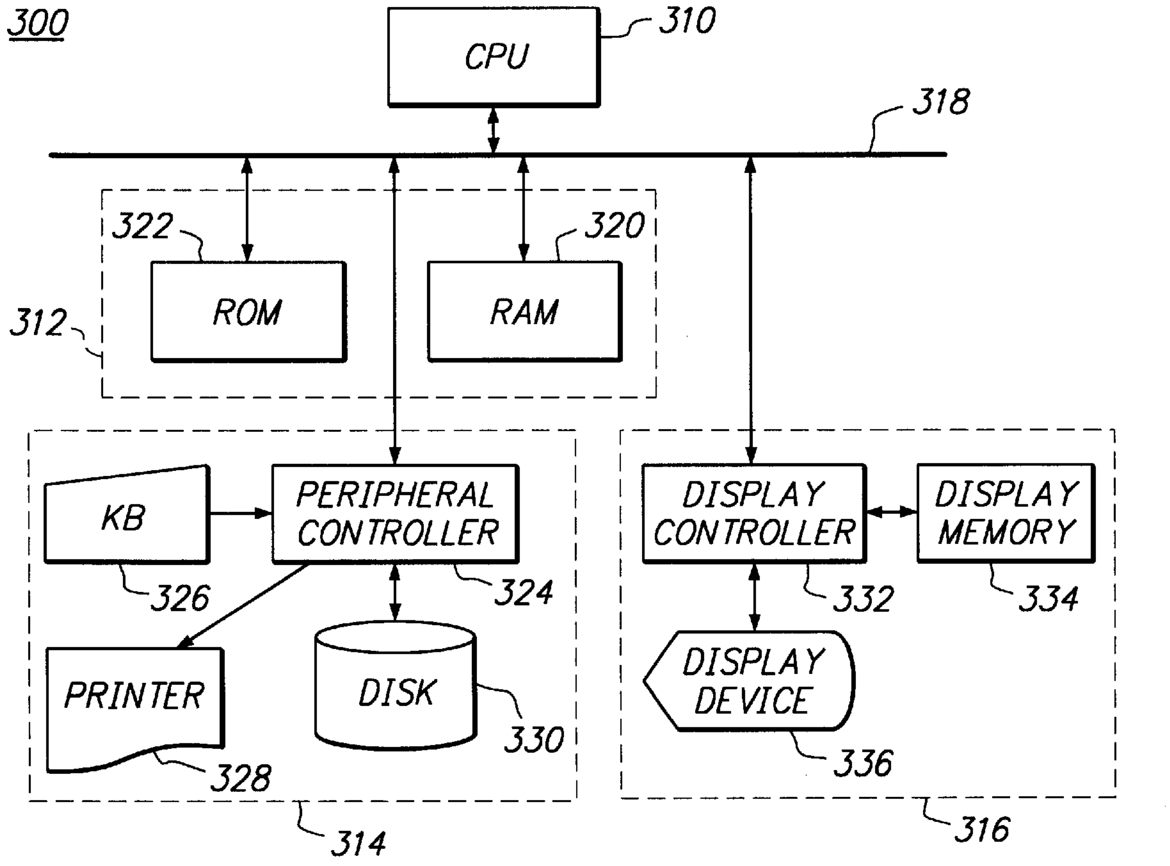
FIG. 3 is a block diagram illustrating a computer system according to one embodiment of present invention.

FIG. 3 is a block diagram illustrating a computer system 300 according to one embodiment of the present invention. The computer system 300 is comprised of four major subsystems: the central processing unit (CPU) 310, the memory subsystem 312, the peripheral subsystem 314, and the display subsystem 316. The subsystems are coupled by a system bus 318, which transports instructions and data among the subsystems. The computer system 300 can be, for example, a desktop system, a portable system, or a portable electronic device such as a hand held computer, a portable music player, or an electronic book.

The CPU 310 is preferably any general or specific-purpose processor. For example, the CPU 310 can be an INTEL ×86 compatible processor, a POWER PC compatible processor, an ARM processor, or some other form of general purpose processor. In addition, the CPU 310 can be a dedicated processor providing functionality to a portable electronic device. The CPU 310 accesses all system resources, sets parameters for the system configuration, performs input/output (I/O) operations, executes software programs, and updates the display device 336 as is well known in the art.

The memory subsystem 312 preferably includes a random access memory (RAM) 320 and a read only memory (ROM) 322. The RAM 320 is preferably synchronous dynamic random access memory (SDRAM) and holds instructions and data for operating the computer system 300 as is well known in the art. The ROM 322 contains fixed instructions and data for operating the computer system 300.

The peripheral subsystem 314 includes a peripheral controller 324 coupled to various peripherals, including a keyboard 326, a printer 328, and a disk drive 330. The peripheral controller 324 controls I/O between the peripherals and the computer system 300. As is well known in the art, the keyboard 326 accepts commands and data from a user of the computer system 300 and the printer 328 prints hard copies of output from the computer system. The disk drive 330 holds data and instructions utilized by the computer system 300. The disk drive 330 can act as a secondary external memory (i.e., Virtual memory) for the computer system 300. The peripherals illustrated herein represent only a few of the possible peripherals that can be coupled to the computer system 300 and it should be recognized that many other peripherals can be utilized in addition to those shown.

The display subsystem 316 includes a display controller 332 coupled to a display memory 334 and a display device 336. The display memory 334 holds data for display on the display device 336 and is preferably SDRAM. The display controller 332 controls access to the display memory 334 and controls the updating of the display device 336 with the data in the display memory 334. The display device 336 can be a cathode ray tube (CRT) display, a liquid crystal display (LCD), or any other type of display. In addition, multiple displays of the same or different types can be used simultaneously.

Figure 4:
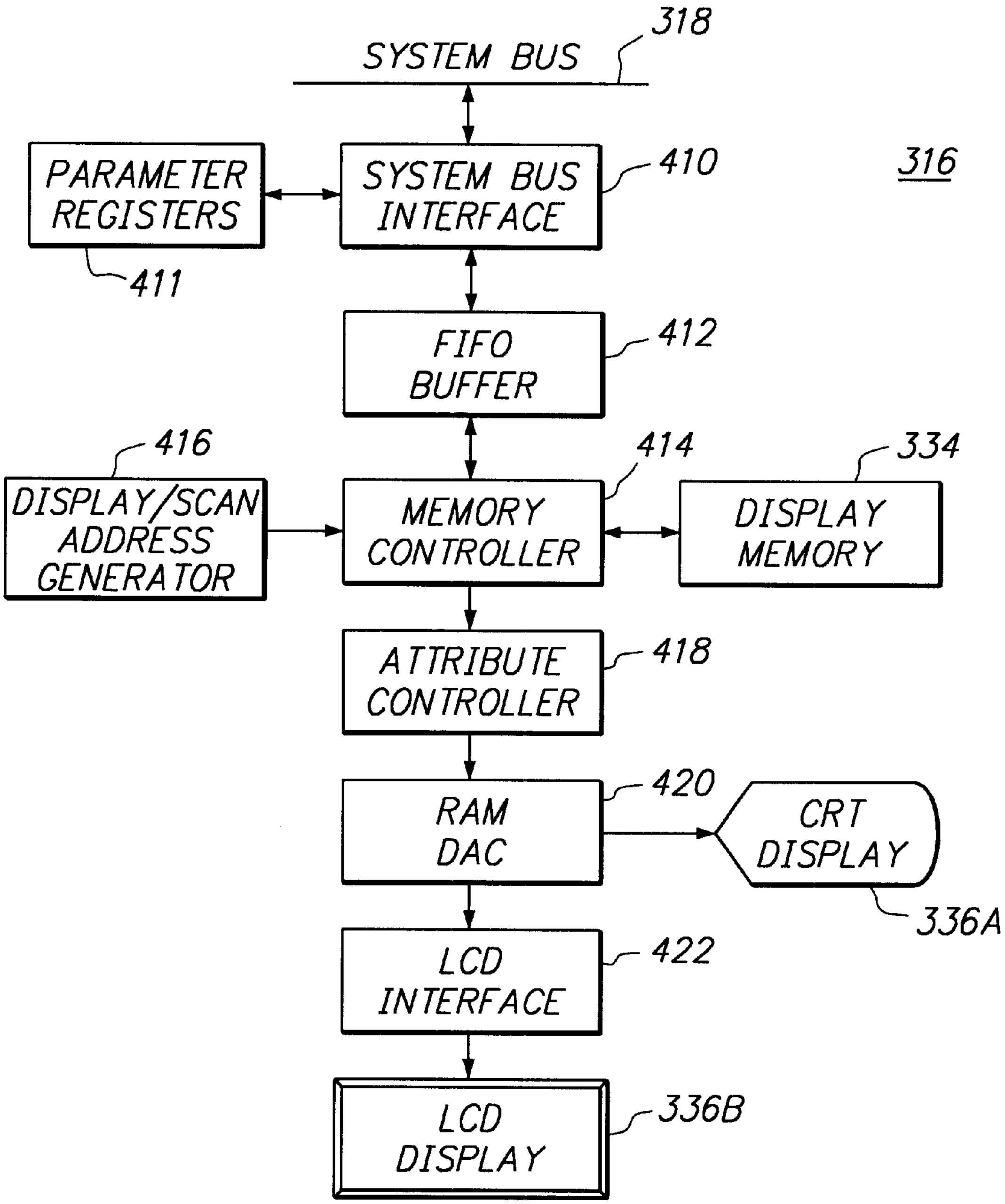
FIG. 4 is a block diagram illustrating a more detailed view of the display subsystem of the computer system of FIG. 3.

FIG. 4 is a block diagram illustrating a more detailed view of the display subsystem 316. The system bus 318 is coupled to a system bus interface 410. The interface 410 is preferably a common interface such as an industry standard architecture (ISA) interface or peripheral connect interface (PCI) and includes address decoder logic. The interface 410 receives instructions and data from the CPU 310 and provides requested data to the CPU. The first-in first-out (FIFO) buffer 412 buffers the instructions and data received from or sent to the interface 410. In addition, a set of one or more parameter registers 411 holds values used by the display subsystem 316. Instructions from the CPU 310 can read and write values to the parameter registers 411 and the display subsystem 316 can read the values.

The memory controller 414 transfers data from or to the FIFO buffer 412 and the display memory 334 based on whether it receives a read or a write request from the system bus 318. When the CPU 310 requests to read data, the memory controller 414 receives the read address from the FIFO buffer 412 and issues a read command to the display memory 334. The memory 334 returns the requested data to the memory controller 414 and the memory controller 414 returns the data to the FIFO buffer 412. When the CPU 310 requests to write data, the memory controller 414 receives the write data and the address from the FIFO buffer 412 and issues a write command to the display memory 334. The display memory 334 writes the data at the given address.

The display/scan address generator 416 generates the memory addresses to be read from the display memory 334 and displayed on the display 336. One memory address location in the display memory 334 is the "starting address" and addresses the data written to the display 336 at the beginning of a scan. For purposes of this description, the starting address is assumed to be zero. Preferably, data is held in the display memory 334 in the same order as it is written to the display 336. Thus, the display/scan address generator 416 preferably increments the read address by one each time the scan moves one pixel across the display. The memory controller 414 reads the addressed data from the display memory 334 and provides the data to the attribute controller 418.

The attribute controller 418 optionally re-maps or alters the color represented by the display data using a register color look-up table and outputs pixel data. The attribute controller 418 may also apply other attribute functions, such as blinking or reverse-video.

The RAM digital to analog converter (DAC) 420 receives the pixel data from the attribute controller 418 and contains RAM color look-up tables indexed by pixel data. The look-up tables output digital values for the red, green, and blue sub-pixels that comprise a color pixel. The RAMDAC 420 also contains three DACs (not shown) for converting the digital color sub-pixel data to analog intensity values that are transmitted to the CRT display 336A.

The RAMDAC 420 also outputs digital pixel data to the LCD interface 422. The digital pixel data are output from the output of the RAM color look-up tables, after the RAM has been accessed and has output the digital sub-pixels, but before the data are converted to analog values. The LCD interface 422 performs different manipulations of data depending on the type of LCD display 336B attached. If the LCD display 336B is a super twisted nematic (STN) LCD, for example, then the LCD interface 422 preferably performs a gray-scale conversion of the color sub-pixels. The converted pixel data is output from the LCD interface 422 to the LCD display 336B. The display 336B itself may include some additional control or conversion logic to manipulate the pixel data before it is displayed.

Figure 1A:
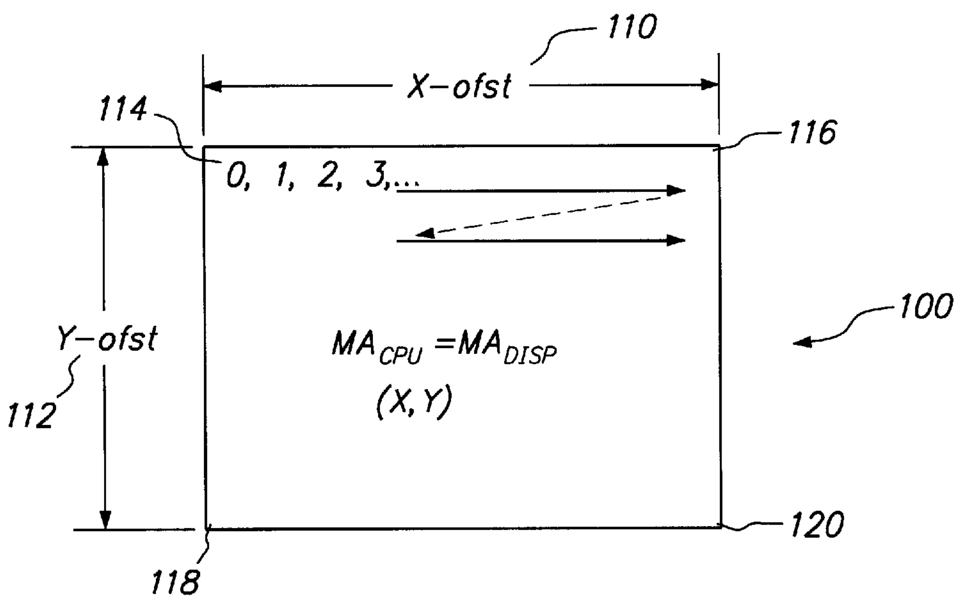
FIGS. 1A and 1B respectively illustrate the scan order on a normal mode and a portrait mode display.
Figure 1B:
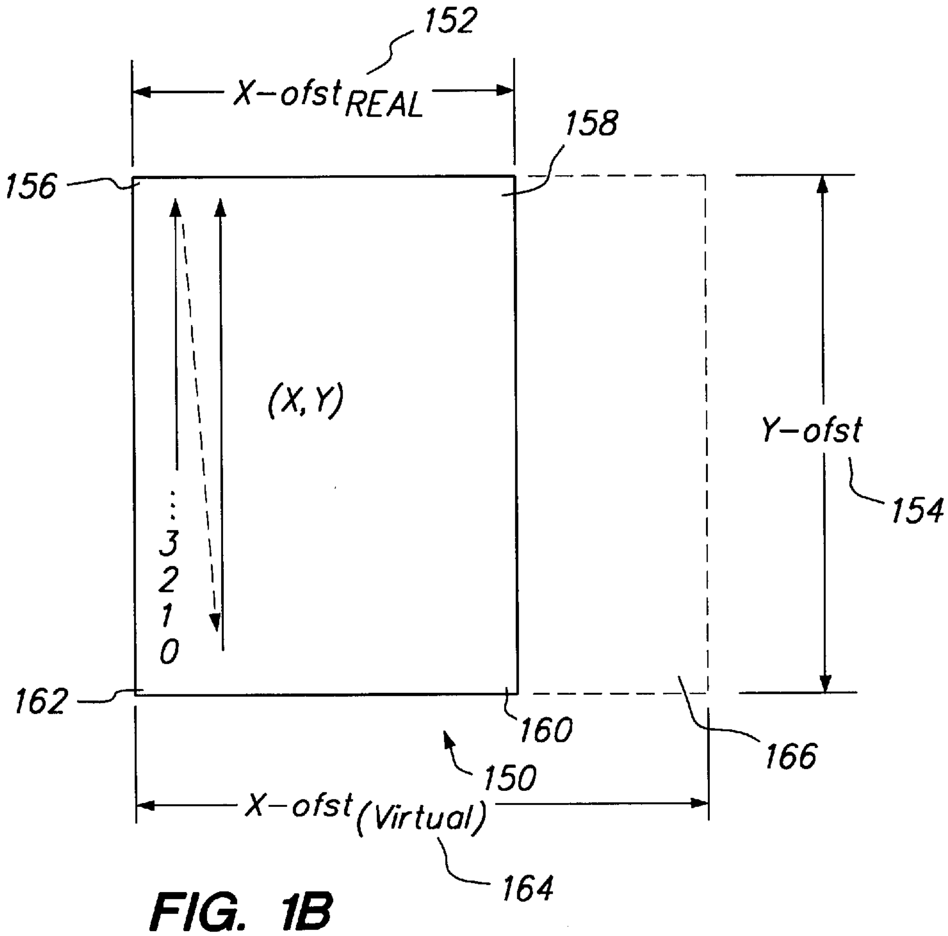
Figure 2:
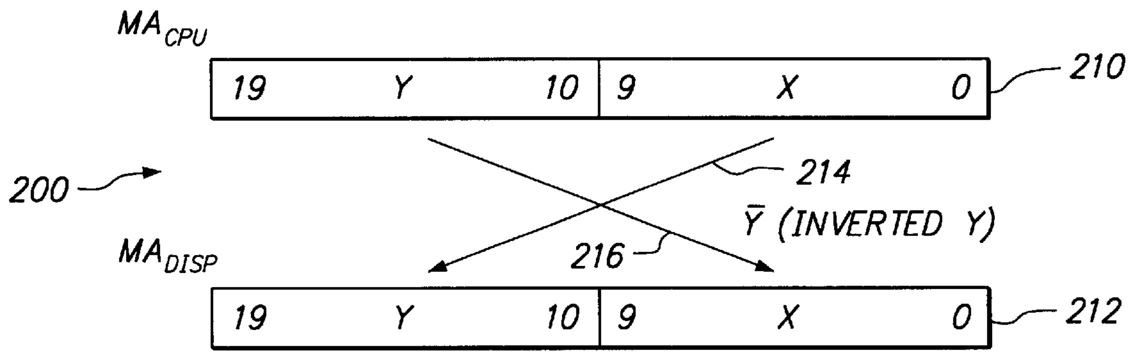
FIG. 2 is a block diagram illustrating address translation from normal mode to portrait mode using a fixed 1024×1024 display.

A display 336 can be oriented in "normal mode" or "portrait mode." In normal mode, as illustrated in FIG. 1A, the refresh scan begins at the top left comer of the display 336 and moves rightward and downward. In portrait mode, as illustrated in FIG. 1B, the display 336 is rotated 90 degrees counterclockwise and the refresh scan begins at the bottom left comer of the display 336 and moves upward and rightward. Thus, in normal mode the starting address corresponds to the upper left comer of the display and in portrait mode the starting address corresponds to the lower left comer of the display.

When the display 336 is in normal mode, the memory address in the display memory 334 corresponding to a position (X, Y) on the display is:

$$MA_{CPU}=MA_{DISP}=(Y*X\text{-}ofst)+X,$$

where (0, 0) corresponds to the upper left corner of the display, $MA_{CPU}$ is the memory address for the CPU, $MA_{DISP}$ is the memory address for the display/scan address generator 416, and X-ofst is the number of pixels displayed on the display 336 in the X-dimension. Thus, X-ofst defines an extent of the display in the X-dimension.

When the display 336 is in portrait mode, the CPU continues to calculate addresses as if the display 336 were in normal mode. However, the memory address in the display memory 334 corresponding to a position (X, Y) on the display 336 is:

$$MA_{DISP}=X*Y\text{-}ofst+((Y\text{-}ofst\text{-}1)-Y),$$

where (0, 0) corresponds to the upper left corner of the display and Y-ofst is the number of pixels displayed on the display 336 in the Y direction. Thus, Y-ofst defines an extent of the display in the Y-dimension. The memory address of a location (X, Y) is different for the CPU 310 than it is for the display/scan address generator 416 when the display 336 is in portrait mode. Accordingly, the memory controller 414 preferably translates the addresses of memory requests received from the CPU 310 into corresponding addresses for the display/scan address generator 416 when the display 336 is in portrait mode. This translation allows the display 336 to be converted from normal mode to portrait mode without requiring extra work on the part of the CPU 310 or the display/scan address generator 416.

As shown in FIG. 1B, a preferred embodiment of the present invention introduces a Virtual value $X\text{-ofst}_{(Virtual)}$ 164 for use when the display 336 is in portrait mode. $X\text{-ofst}_{(Virtual)}$ 164 has a value greater than the real X-ofst (hereinafter referred to as $X\text{-ofst}_{(Real)}$ 152) and is equal to a power of two. Accordingly, $X\text{-ofst}_{(Virtual)}$ 164 defines an extent in the X-dimension that exceeds the number of pixels actually displayed.

The values $X\text{-ofst}_{(Real)}$ 152, $X\text{-ofst}_{(Virtual)}$ 164, and Y-ofst 154, as well as other information about the display, such as the number of bits per pixel (bpp), are preferably stored in the parameter registers 411. Accordingly, software executing on the CPU 310 can set the values and hardware in the display subsystem 316 can access the values.

Software executing on the CPU 310 preferably utilizes the X-$ofst_{(Virtual)}$ value when forming $MA_{CPU}$ in portrait mode. The resulting address is called $MA_{CPU(Virtual)}$ Since $2^n$=X-$ofst_{(Virtual)}$, the n least significant bits of $MA_{CPU(Virtual)}$ always represent the X coordinate. The software also has access to X-$ofst_{(Real)}$, so the software knows which addresses are valid. Therefore, properly written software will not write to the Virtual address space extending beyond X-$ofst_{(Real)}$, Accordingly, the Virtual address space defined by X-$ofst_{(Virtual)}$ can be larger than the physical display memory 334.

Figure 5A:
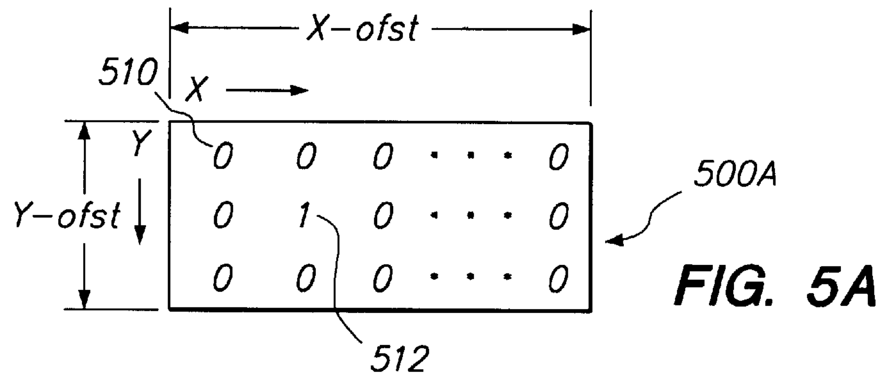
FIGS. 5A and 5B respectively illustrate a normal mode display and a portrait mode display.
Figure 5B:
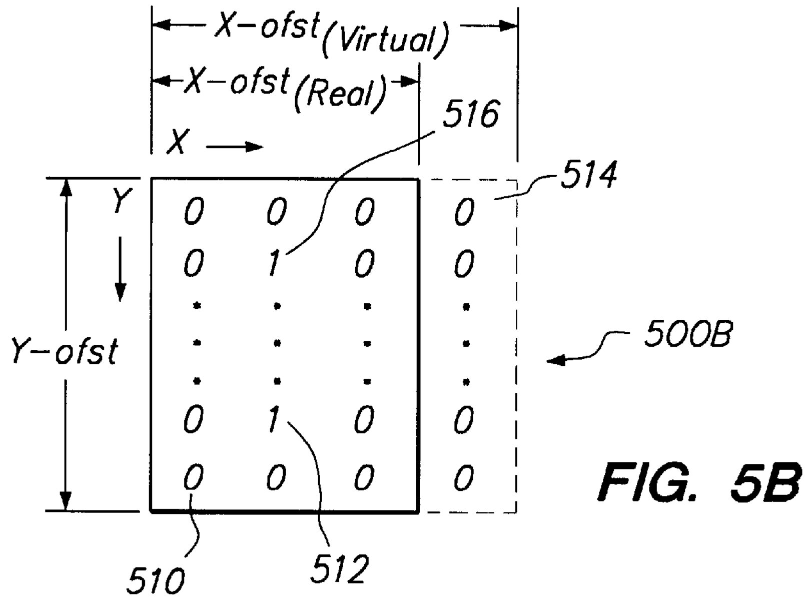

The X-$ofst_{(Virtual)}$ value allows the X coordinate to be isolated from $MA_{CPU(Virtual)}$ without performing a costly division operation. FIGS. 5A and 5B illustrate the operation of the present invention when using X-$ofst_{(Virtual)}$ to translate $MA_{CPU(Virtual)}$ to $MA_{DISP}$. FIG. 5A illustrates a normal mode display 500A. This display 500A has an X-ofst of 32 and a Y-ofst of three. The starting address points to the top left pixel 510. For this example, assume that $MA_{CPU}$ points to pixel 512. Since pixel 512 is the $34^{th}$ pixel in the scan order, $MA_{CPU}$=$MA_{DISP}$=100001, (33 in decimal).

FIG. 5B illustrates the display 500B after it has been rotated 90 degrees counterclockwise. After rotation, X-ofst $_{(Real)}$ is three, Y-ofst is 32, and X-$ofst_{(Virtual)}$ is four, which is the lowest power of two greater than X-$ofst_{(Real)}$. X-ofst $_{(Virtual)}$ can be represented as $2^n$, with n=2. The Virtual portion 514 of the display 500B is illustrated with a broken line.

Now, assume that the CPU 310 wants to write to pixel 516. $MA_{CPU(Virtual)}$ for pixel 516 is equal to =0000101, which identifies the $5^{th}$ pixel from the pixel in the upper left corner. Recall that $MA_{DISP}$=X*Y-ofst+((Y-ofst-1)−Y). Accordingly, it is necessary to derive the X and Y coordinates from $MA_{CPU(virtual)}$, Since n=2, it is known that the two least significant bits of $MA_{CPU(Virtual)}$, 01, represent the X coordinate. The remaining bits, 00001, represent the Y coordinate. By the above formula, $MA_{DISP}$=(01*100000)+(11111−00001)=111110, which is 62 in decimal and addresses pixel 516 in portrait mode.

Figure 6:
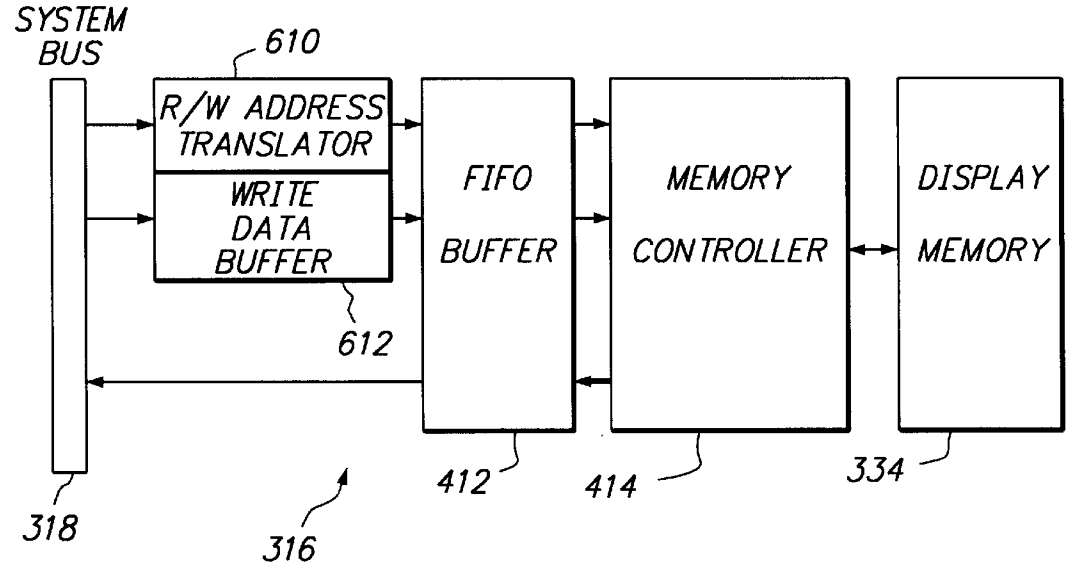
FIG. 6 is a high-level block diagram illustrating the interface between the system bus and the display subsystem.

FIG. 6 is a high-level block diagram illustrating the interface between the system bus 318 and the display subsystem 316. The system bus provides the addresses of read and write requests to a read/write (R/W) address translator 610 and write data to a write data buffer 612. The R/W address translator 610 optionally translates $MA_{CPU}$ $_{(Virtual)}$ to $MA_{DISP}$ using the technique described above and in one embodiment is located in the system bus interface 410.

The outputs of the R/W address translator 610 and the write data buffer 612 are provided to the memory controller 414 through the FIFO buffer 412. The memory controller 414 accesses the display memory 334 and either writes data to, or reads data from, the addressed memory location. The memory controller 414 provides data read from memory 334 in response to a read request to the system bus 318 through the FIFO buffer 412.

Figure 7:
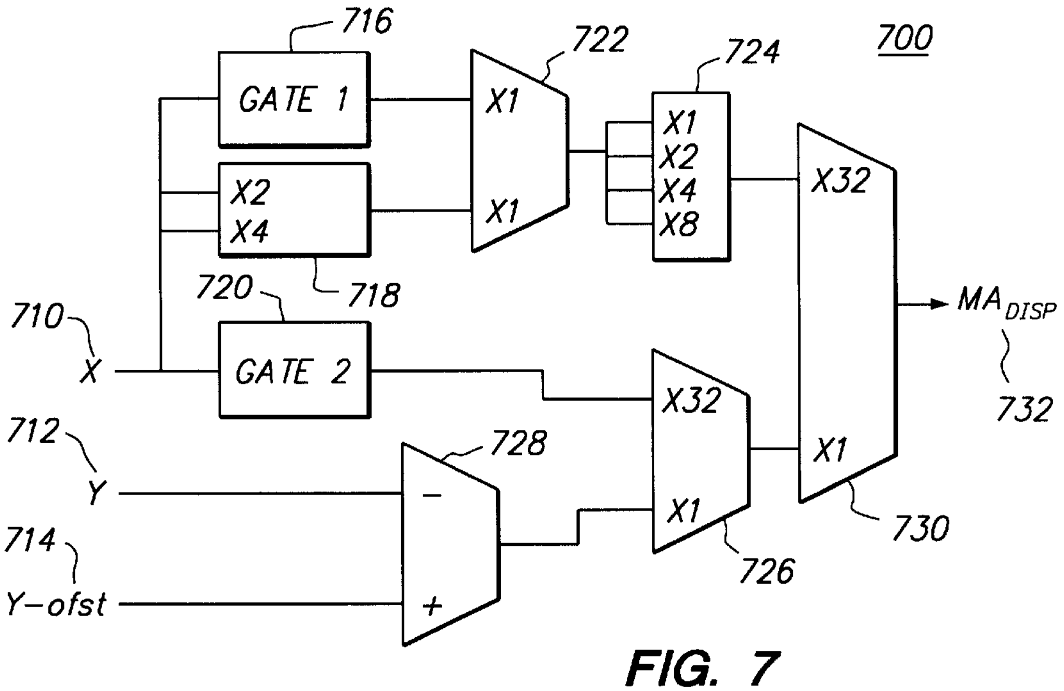
FIG. 7 is a block diagram illustrating address translation logic for converting a normal mode address into a portrait mode address.

FIG. 7 is a block diagram illustrating address translation logic 700 for converting a normal mode address into a portrait mode address. Preferably, this logic 700 is located within the RIW address translator 610 and selectively translates $MA_{CPU(Virtual)}$ into $MA_{DISP}$. The illustrated logic 700 can perform the translation for displays having Y-ofst values of: 64, 96, 128, 160, 192, 256, 320, 384, 512, 640, 768, 800, 1024, and 1280. In one embodiment, the largest possible X-ofst value is 1024. A 10-bit bus width is enough for most real-word applications. The illustrated logic 700 performs address translation for data having eight bpp (byte addressing). Since memory sizes and addresses have a linear relationship with respect to pixel length, those of ordinary skill in the art will recognize that the circuitry illustrated herein can be modified to handle other offset values, bus widths, and pixel lengths (bpp).

In FIG. 7, the notation “Xn” indicates that the value received at the corresponding input is multiplied by n before being utilized by the logic. Thus, X1 means the input is shifted by 0 bits, X2 means the input is shifted by 1 bit, X4 means the input is shifted by 2 bits, X8 means the input is shifted by 3 bits, and X32 means the input is shifted by 5 bits.

The logic includes three inputs 710, 712, 714 for respectively receiving the X coordinate, the Y coordinate, and the Y-ofst value. The X coordinate input is coupled to a first gate 716, a first multiplexer (MUX) 718, and a second gate 720. When enabled, the first gate 716 passes the input to a first adder 722. The first MUX 718 selectively shifts its input by one or two bits and passes. the result to the first adder 722. The second gate 720, when enabled, passes its input to a second adder 726. The first adder 722 adds the values of its inputs and passes the resulting sum to a second NMX 724. The second MUX 724 selectively shifts its inputs by zero, one, two, or three bits and passes its output to a third adder 730.

The Y 712 and Y-ofst 714 inputs are passed to a subtracter 728, which subtracts Y from Y-ofst-1. The resulting value is passed to the second adder 726. The second adder 726 shifts the input received from gate 2 720 by five bits and sums the product with the value received from the subtracter 728. The resulting sum is passed to the third adder 730. The third adder 730 shifts the value received from the second MUX 724 by five bits and sums that value with the input from the second adder 726. The resulting sum is output 732 as $MA_{DISP}$.

Table 1 illustrates the settings for the logic 700 of FIG. 7 to perform address translation with the supported Y-ofst values.

TABLE 1

| GATE 720 | MUX 724 | MUX 718 | GATE 716 | Y-OFST |
|---|---|---|---|---|
| OFF | X1 | X2 | OFF | 64 |
| OFF | X1 | X2 | ON | 96 |
| OFF | X1 | X4 | OFF | 128 |
| OFF | X1 | X4 | ON | 160 |
| OFF | X2 | X2 | ON | 192 |
| OFF | X2 | X4 | OFF | 256 |
| OFF | X2 | X4 | ON | 320 |
| OFF | X4 | X2 | ON | 384 |
| OFF | X4 | X4 | OFF | 512 |
| OFF | X4 | X4 | ON | 640 |
| OFF | X8 | X2 | ON | 768 |
| ON | X8 | X2 | ON | 800 |
| OFF | X8 | X4 | OFF | 1024 |
| OFF | X8 | X4 | ON | 1280 |

Preferably, software executing on the CPU 310 selects the settings in Table 1 by writing values to one or more registers in the display subsystem 316. In addition, the software can use the one or more registers to select whether the display subsystem is in portrait or normal mode, the bpp, the X-ofst, and the Virtual X-ofst.

Figure 8:
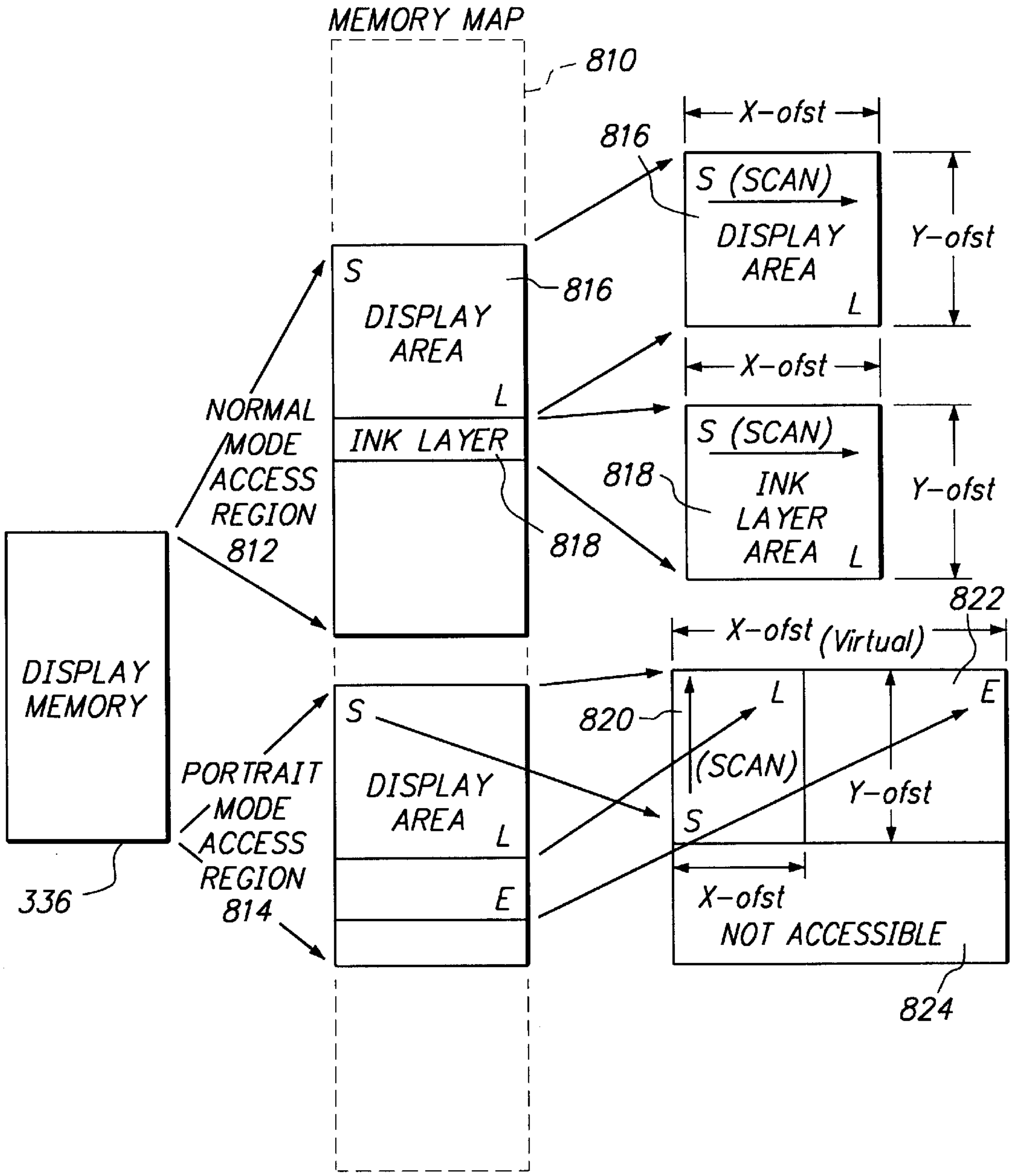
FIG. 8 is a high-level block diagram illustrating the display regions in the display memory.

In order to eliminate any delay when switching from normal to portrait mode or vice versa, the present invention preferably uses dual memory mapping to simultaneously hold normal and portrait mode access regions in the display memory 336. In addition, the dual memory mappings allow the display subsystem 316 to use both modes simultaneously, for example, a portrait mode display can be overlaid on a normal mode display. FIG. 8 is a high-level block diagram illustrating the display buffers in the display memory 336. A memory map 810 logically separates the display memory 336 into different regions, including the normal mode access region 812 and the portrait mode access region 814.

The normal mode access region 812 is preferably separated into a display area 816 and an ink layer area 818. The display area 816 preferably holds data having 8 or 16 bpp, which can support an image having 256 or 65K colors, respectively. The ink layer area 818 preferably holds data having 2 bpp, which can support an image having four colors. In a preferred embodiment, the ink layer area 818 is overlaid on the display area 816 when the images are displayed, allowing the computer system 300 to support pen-based computing.

The display area 816 and the ink layer area 818 occupy respective areas in the memory map 810. Each area is defined by an X-ofst and a Y-ofst. Although the X-ofst and Y-ofst of the ink layer area 818 are equal to the display area 816 in one embodiment, the ink layer area 818 occupies less memory since it has fewer bpp. The display area 816 and ink layer area 818 each have a starting address (identified with an "S" in FIG. 8) representing the first scan position and pixel at the upper left corner of the display and a last address (identified with an "L") representing the last scan position and the lower right corner of the display.

The portrait mode access region 814 has a display area 820, a Virtual area 822, and an additional area 824. Although the embodiment illustrated in FIG. 8 does not contain a portrait mode ink layer area, those of ordinary skill in the art will recognize that an ink layer area can easily be included. The portrait mode display area 820 holds data for the pixels shown on the display. The Virtual area 822 is the area defined by the portion of $\text{X-ofst}_{(Virtual)}$ which exceeds $\text{X-ofst}_{(Real)}$. The ending address in the Virtual area is identified with an "E." The additional area 824 optionally holds display data when Y-ofst is increased. When Y-ofst is less than its maximum value, the additional area 824 is inaccessible.

Figure 9:
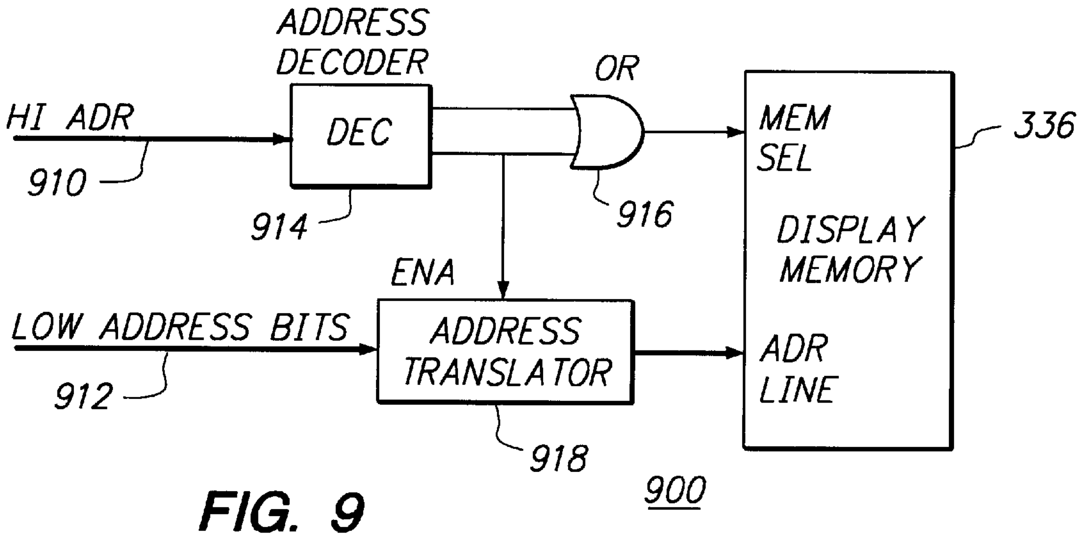
FIG. 9 is a block diagram illustrating digital logic for selecting display modes and memory regions according to an embodiment of the present invention.

FIG. 9 is a block diagram illustrating digital logic 900 for selecting display modes and memory regions according to an embodiment of the present invention. In one embodiment, the illustrated logic 900 resides within the R/W address translator 610. High address bits 910 are input to a decoder 914 and low address bits 912 are input to an address translator 918. The decoder has two output lines which are both input to an OR gate 916. The output of the OR gate 916 is input to a "memory select" input of the display memory 336. One of the outputs from the address decoder 914 is coupled to an enable input of the address translator 918. The outputs of the address translator 918 are passed to the address lines of the display memory 336. The address translator 918 of FIG. 9 generally corresponds to the RJW address translator 610 shown in FIG. 6.

In use, the high address bits and corresponding output of the decoder 914 are used to select either the normal or portrait mode access regions 812, 814 in the display memory 336. In addition, the high address bits are also used to optionally enable translation by the address translator 918. When the translator 918 is enabled, it converts the input $MA_{CPU(Virtual)}$ into MAD sp and provides the output to the memory 336. Otherwise, the translator 918 passes the received address to the memory unchanged. The corresponding data provided to the memory 336 (not shown in FIG. 9) is written to the address received from the translator 918. Accordingly, the illustrated logic 900 allows rapid switching between normal mode and portrait mode.

In sum, the present invention allows rapid and software-transparent switching between a normal mode display and a portrait mode display. The use of a Virtual X-ofst allows the address translation to be made without performing a computationally intensive division step. The dual assigned memory space enables quick mode changes between normal mode and portrait mode.

I claim:

1. A method of translating an address, comprising the steps of:

defining a first access region having first and second offsets, the first offset exceeding a first displayed extent of a display and the second offset equal to a second displayed extent of the display, wherein the second offset is not equal to a power of two; and receiving a fist address capable of addressing the defined first access region, the first address using the first and second offsets to specify a location on the display for a first orientation of the display, and translating the first address into a second address, the second address specifying the location on the display for a second orientation of the display.

2. The method of claim 1, wherein the specified location is within the first and second displayed extents of the display.

3. The method of claim 1, wherein the location specified on the display by the first address comprises first and second coordinates and the translating step comprises the steps of:

determining the first and second coordinates for the location from the first address and the first and second offsets;

swapping the first and second coordinates;

inverting the second coordinate; and calculating the second address from the swapped first and second coordinates and the invented second coordinate.

4. The method of claim 1, further comprising the step of:

defining a second access region having Third and fourth offsets, the third offset corresponding to a third displayed extent of the display and the fourth offset corresponding to a fourth displayed extent of the display.

5. The method of claim 4, wherein the step of receiving the first address comprises the step of:

determining whether tie first address specifies a location in the first access region.

6. The method of claim 5, wherein the translating step is performed only if the first address specifies a location in the first access region.

7. A system for displaying data on a display, the system comprising:

an addressable memory for holding data for display, wherein a region of the memory defines a display area having real first and second offsets;

an interface for receiving a request to access data at a first address in the memory, wherein the first address specifies a position in the display area using a Virtual fist offset and the real second offset, wherein the real second offset is not equal to a power of two; and an address translator for receiving the request from the interface and selectively translating the request from the first address to a second address, wherein the second address specifies the position in the display area using the real first and second offsets.

8. The system of claim 7, wherein the virtual first offset is a power of two and exceeds the real offset.

9. The system of claim 7, further comprising:

a memory controller coupled to the address translator and the addressable memory, the memory controller for reading from and writing to addresses in the memory responsive to translated requests received from the address translator.

10. The system of claim 7, wherein the address translator comprises:

address translation logic for controllably translating the memory request from the first address to the second address.

11. The system of claim 10, wherein the address translation logic translates the request from the first address to the second address using one of a selected range of real second offsets.

12. The system of claim 7, wherein the addressable memory further comprises:

a second region defining a separate second display area.

13. The system of claim 12, wherein the request comprises at least one region selection bit, further comprising:

circuitry for enabling the address translator and selecting between the separate first and second display areas responsive to a state of the region selection bit.

14. A display subsystem for a computer system supporting first and second orientations of a display coupled to the computer system, the display subsystem comprising:

a memory for holding display data, the memory comprising:

a first access region adapted to hold display data for the first orientation of the display, wherein the first access region is defined by a first offset exceeding a first displayed extent of the display and a second offset equal to a second displayed extent of the display, wherein the second offset is not equal to a power of two; and a second access region separate from the first access region and adapted to hold display data for the second orientation of the display; and an address translator for receiving a memory request using the first and second offsets to specify an address in the first access region and for translating the memory request to reflect the first orientation of the display.

15. A display subsystem for a computer system supporting first and second orientations of a display coupled to the computer system, the display subsystem comprising:

a memory for holding display data, the memory comprising:

a first access region adapted to hold display data for the first orientation of the display, wherein the first access region is defined by $X\text{-ofst}_{(Real)}$, which defines an extent of the display in an X dimension, $X\text{-ofst}_{(Virtual)}$, which defines an extent in the X dimension exceeding $X\text{-ofst}_{(Real)}$, and Y-ofst, which defines an extent of the display in a Y dimension, and wherein the Y-ofst is not equal to a power of two; and a second access region separate from the first access region and adapted to hold display data for the second orientation of the display; and an interface for receiving memory requests from the computer system, the memory requests specifying addresses in the first and second access regions, wherein a memory request specifies an address in the first access region using $X\text{-ofst}_{(Virtual)}$ and Y-ofst.

* * * * *

UNITED STATES PATENT AND TRADEMARK OFFICE

CERTIFICATE OF CORRECTION

PATENT NO. : 6,639,603 B1
DATED : October 28, 2003
INVENTOR(S) : Takatoshi Ishii It is certified that error appears in the above-identified patent and that said Letters Patent is hereby corrected as shown below:

Column 10,
Line 20, please delete "fist" and insert -- first --.
Line 40, please delete "invented" and insert -- inverted --.
Line 42, please delete "Third" and insert -- third --.
Line 50, please delete "tie" and insert -- the --.
Line 62, please delete "Virtual fist" and insert -- virtual first --.

Signed and Sealed this

Thirtieth Day of December, 2003

JAMES E. ROGAN
*Director of the United States Patent and Trademark Office*